(12) United States Patent
Hikawa et al.

(10) Patent No.: US 11,201,905 B2
(45) Date of Patent: Dec. 14, 2021

(54) SERVICE PROCESSING SYSTEM AND SERVICE PROCESSING METHOD

(71) Applicant: FUJIFILM BUSINESS INNOVATION CORP., Tokyo (JP)

(72) Inventors: Yuji Hikawa, Ebina (JP); Yukio Tajima, Ebina (JP); Kazuko Kirihara, Ebina (JP); Akihiro Enomoto, Ebina (JP); Hidekazu Ozawa, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 30 days.

(21) Appl. No.: 16/372,737

(22) Filed: Apr. 2, 2019

(65) Prior Publication Data

US 2019/0230144 A1    Jul. 25, 2019

Related U.S. Application Data

(60) Continuation of application No. 15/019,542, filed on Feb. 9, 2016, now Pat. No. 10,291,683, which is a
(Continued)

(30) Foreign Application Priority Data

Mar. 24, 2003 (JP) ................................. 2003-081453

(51) Int. Cl.
*G06F 15/16* (2006.01)
*H04L 29/08* (2006.01)
(Continued)

(52) U.S. Cl.
CPC ............ *H04L 67/02* (2013.01); *G06F 3/0484* (2013.01); *G06F 3/04845* (2013.01); *G06Q 10/10* (2013.01); *H04N 1/0035* (2013.01); *H04N 1/00477* (2013.01); *H04N 1/00503* (2013.01); *H04N 1/00957* (2013.01)

(58) Field of Classification Search
None
See application file for complete search history.

(56) References Cited

U.S. PATENT DOCUMENTS 5,220,674 A    6/1993 Morgan et al.
5,467,434 A    11/1995 Hower, Jr. et al.
(Continued)

FOREIGN PATENT DOCUMENTS

JP    H06-110629 A    4/1994
JP    H09-325928 A    12/1997
(Continued)

OTHER PUBLICATIONS

May 7, 2020 Office Action issued in U.S. Appl. No. 13/745,071.
(Continued)

*Primary Examiner* — Phuoc H Nguyen
(74) *Attorney, Agent, or Firm* — Oliff PLC

(57) ABSTRACT

In a case where a service for performing specified processings of document data as one job is processed in a cooperative manner on a network, a service processing state is exhibited in a proper notice form in each job unit and in each processing unit in the job, so that the processing state can be properly recognized from the viewpoint of accounting, security and privacy.

4 Claims, 13 Drawing Sheets

Related U.S. Application Data continuation of application No. 13/745,014, filed on Jan. 18, 2013, now abandoned, which is a continuation of application No. 12/458,359, filed on Jul. 9, 2009, now abandoned, which is a division of application No. 10/661,503, filed on Sep. 15, 2003, now abandoned.

(51) Int. Cl.
*G06Q 10/10* (2012.01)
*H04N 1/00* (2006.01)
*G06F 3/0484* (2013.01)

(56) References Cited

U.S. PATENT DOCUMENTS

| | | |
|---|---|---|
| 5,589,625 A | 12/1996 | Saarma et al. |
| 5,596,750 A | 1/1997 | Li et al. |
| 5,625,757 A | 4/1997 | Kageyama et al. |
| 5,760,775 A | 6/1998 | Sklut et al. |
| 5,761,396 A | 6/1998 | Austin et al. |
| 5,774,661 A | 6/1998 | Chatterjee et al. |
| 5,812,843 A | 9/1998 | Yamazaki et al. |
| 5,815,152 A | 9/1998 | Collier et al. |
| 5,859,711 A | 1/1999 | Barry et al. |
| 5,870,712 A | 2/1999 | Kiuchi et al. |
| 5,918,226 A | 6/1999 | Tarumi et al. |
| 5,960,404 A * | 9/1999 | Chaar ............... G06F 9/5038 705/7.26 |
| 5,974,234 A | 10/1999 | Levine et al. |
| 6,029,238 A | 2/2000 | Furukawa |
| 6,122,633 A | 9/2000 | Leymann et al. |
| 6,182,136 B1 | 1/2001 | Ramanathan et al. |
| 6,369,909 B1 | 4/2002 | Shima |
| 6,483,524 B1 | 11/2002 | Petchenkine et al. |
| 6,502,147 B2 | 12/2002 | Reilly |
| 6,549,516 B1 | 4/2003 | Albert et al. |
| 6,560,631 B1 | 5/2003 | Ishihara et al. |
| 6,604,124 B1 | 8/2003 | Archbold |
| 6,701,366 B1 | 3/2004 | Kallas et al. |
| 6,708,189 B1 | 3/2004 | Fitzsimons et al. |
| 6,772,216 B1 | 8/2004 | Ankireddipally et al. |
| 6,775,023 B1 | 8/2004 | Fukunaga et al. |
| 6,785,015 B1 | 8/2004 | Smith et al. |
| 6,822,754 B1 | 11/2004 | Shiohara |
| 6,898,625 B2 * | 5/2005 | Henry et al. ............ G06F 13/00 709/206 |
| 6,915,514 B1 | 7/2005 | Machida |
| 6,956,662 B1 | 10/2005 | Kamimura |
| 6,961,144 B2 | 11/2005 | Usami |
| 6,966,029 B1 | 11/2005 | Ahem |
| 6,970,261 B1 | 11/2005 | Robles |
| 7,007,275 B1 | 2/2006 | Hanson et al. |
| 7,054,899 B1 | 5/2006 | Yamamoto |
| 7,069,536 B2 | 6/2006 | Yaung |
| 7,099,027 B1 * | 8/2006 | Barry ................... G06F 3/1212 358/1.15 |
| 7,134,150 B2 | 11/2006 | Stewart |
| 7,136,941 B2 | 11/2006 | Nguyen et al. |
| 7,146,413 B2 | 12/2006 | Spitzer et al. |
| 7,168,077 B2 | 1/2007 | Kim et al. |
| 7,196,805 B1 | 3/2007 | Toebes et al. |
| 7,200,860 B2 | 4/2007 | Ghaffar |
| 7,315,389 B2 | 1/2008 | Kuwata et al. |
| 7,363,377 B1 | 4/2008 | Alban et al. |
| 7,398,237 B2 | 7/2008 | Agostini et al. |
| 8,162,125 B1 * | 4/2012 | Csulits ................. G07D 7/12 194/206 |
| 2002/0030840 A1 | 3/2002 | Itaki et al. |
| 2002/0055849 A1 | 5/2002 | Georgakopoulos et al. |
| 2002/0111841 A1 | 8/2002 | Leymann et al. |
| 2002/0129238 A1 | 9/2002 | Toh et al. |
| 2002/0135816 A1 | 9/2002 | Ohwa |
| 2002/0161462 A1 | 10/2002 | Fay et al. |
| 2002/0174048 A1 | 11/2002 | Dheer et al. |
| 2003/0014479 A1 | 1/2003 | Shafron et al. |
| 2003/0061266 A1 | 3/2003 | Ouchi |
| 2003/0093525 A1 * | 5/2003 | Yeung ............... H04N 1/00204 709/225 |
| 2003/0103232 A1 | 6/2003 | Twede |
| 2003/0131075 A1 | 7/2003 | Bear et al. |
| 2003/0142128 A1 | 7/2003 | Reulein et al. |
| 2003/0197895 A1 | 10/2003 | Koppich et al. |
| 2004/0046982 A1 | 3/2004 | Jeyachandran et al. |
| 2004/0075689 A1 | 4/2004 | Schleiss et al. |
| 2004/0148271 A1 | 7/2004 | Wood |
| 2004/0205455 A1 * | 10/2004 | Dathathraya ........... H04L 67/34 715/273 |
| 2005/0096872 A1 | 5/2005 | Blevins et al. |
| 2006/0005229 A1 | 1/2006 | Palekar et al. |
| 2007/0146781 A1 * | 6/2007 | Garg .................... G06F 3/12 358/1.15 |
| 2007/0153334 A1 | 7/2007 | Lech et al. |

FOREIGN PATENT DOCUMENTS

| | | |
|---|---|---|
| JP | H10-83263 A | 3/1998 |
| JP | H11-196125 A | 7/1999 |
| JP | 2000-099686 A | 4/2000 |
| JP | 2000-105677 A | 4/2000 |
| JP | 2000-105678 A | 4/2000 |
| JP | 2000-137592 A | 5/2000 |
| JP | 2000-215244 A | 8/2000 |
| JP | 2001-195295 A | 7/2001 |
| JP | 2001-325389 A | 11/2001 |
| JP | 2002-073576 A | 3/2002 |
| JP | 2002-099686 A | 4/2002 |
| JP | 2002-108632 A | 4/2002 |

OTHER PUBLICATIONS

Nov. 21, 2019 Office Action issued in U.S. Appl. No. 13/745,071.
Apr. 23, 2015 Office Action issued in U.S. Appl. No. 13/745,071.
Jul. 17, 2015 Office Action issued in U.S. Appl. No. 13/745,014.
Nov. 6, 2015 Office Action issued in U.S. Appl. No. 13/745,071.
Jan. 14, 2016 Office Action issued in U.S. Appl. No. 13/745,014.
Mar. 10, 2011 Office Action issued in U.S. Appl. No. 12/432,212.
Nov. 21, 2011 Office Action issued in U.S. Appl. No. 12/432,212.
Nov. 23, 2010 Office Action issued in U.S. Appl. No. 12/432,212.
Mar. 9, 2012 Office Action issued in U.S. Appl. No. 12/432,212.
Jul. 31, 2012 Office Action issued in U.S. Appl. No. 12/432,212.
Nov. 23, 2016 Office Action issued in U.S. Appl. No. 13/745,071.
May 4, 2017 Office Action issued in U.S. Appl. No. 13/745,071.
Jan. 25, 2018 Office Action issued in U.S. Appl. No. 13/745,071.
Jul. 8, 2019 Office Action issued in U.S. Appl. No. 13/745,071.
Aug. 5, 2020 Office Action issued in U.S. Appl. No. 16/372,755.
Feb. 1, 2021 Office Action issued in U.S. Appl. No. 16/372,755.
Sep. 14, 2021 Office Action Issued in U.S. Appl. No. 16/372,755.

* cited by examiner

FIG. 3

| SERVICE CLASS |
| --- |
| SERVICE NAME |
| SERVICE ICON |
| LOCATION INFORMATION |
| INPUT |
| OUTPUT |
| PARAMETER RESTRICTION RULES |
| SERVICE LOCATION |
| METHOD NAME |
| INVOCATION SCHEME |
| IMPLICIT ELEMENTS |
| ANNUNCIATION INFORMATION |

FIG. 5

| SERVICE CLASS |
| --- |
| SERVICE NAME |
| SERVICE ICON |
| LOCATION INFORMATION |
| INPUT |
| OUTPUT |
| PARAMETER RESTRICTION RULES |
| SERVICE LOCATION |
| METHOD NAME |
| INVOCATION SCHEME |
| IMPLICIT ELEMENTS |
| ANNUNCIATION INFORMATION |
| FLOW<br>(INVOCATION, MAP, METHOD)<br>(CONTROL STRUCTURE, LOGICAL OPERATION,<br>ANNUNCIATION PROCESSING) |

SERVICE PROCESSING SYSTEM AND SERVICE PROCESSING METHOD

This is a Continuation of application Ser. No. 15/019,542 filed Feb. 9, 2016, which is a Continuation of application Ser. No. 13/745,014 filed Jan. 18, 2013, which is a Continuation of application Ser. No. 12/458,359 filed. Jul. 9, 2009, which in turn is a Divisional of Application Ser. No. 10/661,503 filed Sep. 15, 2003, which claims the benefit of Japanese Application No. 2003-081453 filed Mar. 24, 2003. The disclosure of the prior applications is hereby incorporated by reference herein in its entirety.

BACKGROUND OF THE INVENTION

Field of the Invention

The present invention relates to a service processing system in which a service for performing specified multiple processings of document data is processed in a cooperative manner on a network, and a service processing method.

Description of the Related Art

A network system is proposed in which a scanner, a facsimile machine (hereinafter referred to as a FAX), a copying machine, a composite machine in which these are combined, a personal computer, a mail server and the like are mutually connected to ach other through a network, so that paper documents and electronic information are shared.

The network system as stated above is configured such that for example, a document file is captured from an input system such as a scanner for reading a manuscript or a paperless FAX, and is processed by a processing system of image manipulation, character recognition or the like, and then, the document file is delivered to the outside through an output system such as a printer or a mail server, Here, in general, the capture of the document file, the manipulation processing of the captured data, and the delivery after the manipulation processing are independently carried out.

Thus, in the case where the capture operation of the document file, the manipulation processing operation of the captured data, and the delivery operation after the manipulation processing are continuously performed, an operator must make a specified setting for each of the operations.

For example, the operator uses a client terminal for collectively managing the above processing devices to open, on a display part, instruction windows relating to the capture of the document file, the manipulation processing of the captured data, and the delivery processing after the manipulation processing, and must perform specified input operations, and therefore, the operation efficiency has been very poor.

In order to solve this, a work flow system is conventionally introduced in which a series of processings from input to output are linked on a network and are carried out in previously defined order.

In the work flow system, consideration is given to a work flow generally used in an office, such as approval and circulation, and the system is developed by computerizing an existing paper-based transaction system as it (see patent document 1, patent document 2, and patent document 3).

[Patent Document 1]
JP-A-2002-99686
[Patent Document 2]
JP-A-2001-325389
[Patent Document 3]
JP-A-2001-195295

However, although the conventional work flow system is a very effective system from the viewpoint of operation efficiency, it has not been perfect from the viewpoint of accounting and security.

That is, in the ease where the processing along the work flow is carried out, since it is impossible to confirm by a client terminal that the processing by plural processing devices has been carried out, it has been difficult to grasp the progress of a job set as the work flow.

Thus, it is conceivable that a setting is made in such a fixed way that each of the processing devices reports the progress thereof when the processing of the processing device is carried out. However, for example, in the case where a document or the like handled by the processing device is a document or the like permitted to be read out only in the work flow, a report is also made under the situation in which it is not permitted, and this can be a problem from the viewpoint of security or privacy.

Besides, although it is also conceivable to relegate the output of the report of the processing situation set for the respective processing devices, this also becomes a problem from the viewpoint of security or privacy.

Further, with respect to the processing carried out by a system administrator (Key Operator), a CE (Customer Engineer) or the like, since there is also information which is desired not to be known to a general user (Casual Use the setting in the fixed way causes trouble.

SUMMARY OF THE INVENTION

The present invention has been made in view of the above circumstance and provides a service processing system and a service processing method, in which in a case where a service for performing specified multiple processings of document data as one job is processed in a cooperative manner on a network, a service processing state is exhibited in a proper notice form in each job unit and in each processing unit in the job, so that the processing state can be properly recognized from the viewpoint of accounting, security and privacy.

According to an aspect of the invention, a service processing system in which a service for performing specified multiple processings of document data is processed in a cooperative manner on a network, the system includes: an indication data creation part for creating, for each job as a unit of the associated processings, indication data to indicate a processing procedure of the job, and notice condition data to indicate a notice event and a notice form thereof at each processing stage in the job; a management control part for managing progress of each of the processings in the job on the basis of contents recited in the indication data created by the indication data creation part; and a notice part for sending a notice during the progress of each of the processings in the job on the basis of contents recited in the notice condition data.

Besides, according to another aspect of the invention, a service processing method in which a service for performing specified multiple processings of document data is processed in a cooperative manner on a network, the method includes the steps of: creating, for each job as a unit of the associated processings, indication data to indicate a processing procedure of the job, and notice condition data to indicate a notice event and a notice form thereof at each processing stage in the job; managing progress of each of the processings in the job on the basis of contents recited in the created indication data; and sending a notice during the progress of each of the processings in the job on the basis of contents recited in the notice condition data.

Besides, according to another aspect of the invention, a job management device for managing progress of each of processings in a service processing system in which a service for performing specified multiple processings of document data is processed in a cooperative manner on a network, the device includes: an indication data creation part for creating, for each job as a unit of the associated processings, indication data to indicate a processing procedure of the job, and notice condition data to indicate a notice event and a notice form thereof at each processing stage in the job; a management control part for managing progress of each of the processings in the job on the basis of contents recited in the indication data created by the indication data creation part; and a notice part for sending a notice during the progress of each of the processings in the job on the basis of contents recited in the notice condition data.

Besides, according to another aspect by the invention, a job management device for managing progress of each of processings in a service processing system in which a service for performing specified multiple processings of document data is processed in a cooperative manner on a network, the device includes: an indication data reception part for receiving, for each job as a unit of the associated processings, indication data to indicate a processing procedure of the job, and notice condition data to indicate a notice event and a notice form thereof at each processing stage in the job; a management control part for managing progress of each of the processings in the job on the basis of contents recited in the indication data received by the indication data reception part; and a notice part for sending a notice during the progress of each of the processings in the job on the basis of contents recited in the notice condition data.

Besides, according to another aspect of the invention, a service processing device for processing a service in a service processing system in which the service for performing specified multiple processings of document data is processed in a cooperative manner on a network, the device includes: an indication data reception part for receiving, for each job as a unit of the associated processings, indication data to indicate a processing procedure of the job, and notice condition data to indicate a notice event and a notice form thereof at each processing stage in the job; a management control part for managing progress of each of the processings in the job on the basis of contents recited in the indication data received by the indication data reception part; and a notice part for sending a notice during the progress of each of the processings in the job on the basis of contents recited in the notice condition data.

BRIEF DESCRIPTION OF THE DRAWINGS

Preferred embodiments of the present invention will be described in detail based on the following figure, wherein:

FIG. 3 is a schematic view showing a structure of I/F information according to the first embodiment of the invention;

FIG. 5 is a schematic view showing a script formed in an MXL format according to the first embodiment of the invention;

DETAILED DESCRIPTION OF THE INVENTION

Hereinafter, preferred embodiments of the present invention will be described in detail with reference to the drawings.

First Embodiment (System Configuration)

Figure 1:
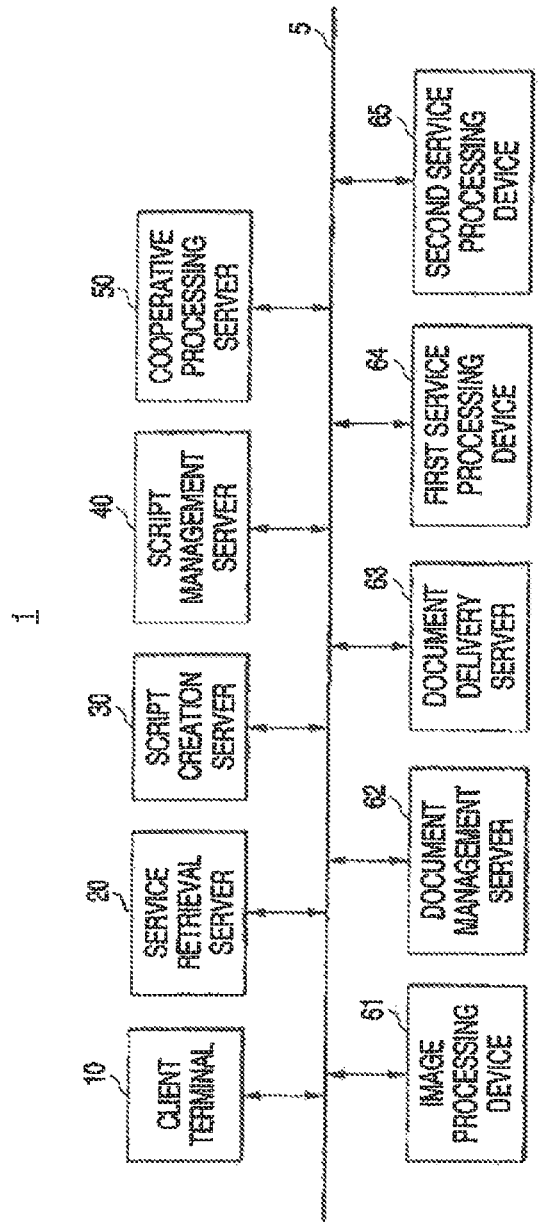
FIG. 1 is a block diagram showing the outline of a document processing system according to a first embodiment of the invention.

FIG. 1 is a block diagram showing the configuration of a document processing system 1 according to a first embodiment of the invention.

The document processing system 1 is such that various services and applications are connected through a network 5. Here, the service is a function usable on a document in accordance with a request from the outside. The service is equivalent to, for example, copy, print, scan, facsimile transmission and reception, mail delivery, storing into repository and readout from repository, OCR (Optical Character Recognition) processing, noise removal processing, and the like, and is not particularly limited.

The document processing system 1 specifically includes a client terminal 10 provided with a user interface and for linking plural services with each other to indicate a desired processing of a user, a service retrieval server 20 for retrieving a desired service of the user, a script creation server 30 for creating a script from information relating to the service cooperation indicated by the client terminal 10, a script management server 40 for managing the script, and a cooperative processing server 50 for executing a cooperative processing of the respective services in accordance with the script.

Further, the document processing system 1 includes an image processing device 61 for performing an image processing such as a noise removal processing of an image document, an image rotation processing, an OCR processing, and binding of images, a document management server 62 for managing documents, a document delivery server 63 for delivering documents, a first service processing device 64 for performing a first service processing, and a second service processing device 65 for performing a second service processing.

Incidentally, in this embodiment, although the document processing system 1 has the configuration in which the plural servers for performing specific service processings are connected through the network 5, as long as the plural services are connected through the network 5, the configuration is not particularly limited.

Here, the script is data containing, in a case where a series of processings are decomposed into plural functional processings, information expressing a relation among the respective functions, interface (I/F) information for invoking the respective functions, and information for configuring a graphical user interface (GUI) relating to the series of processings.

Figure 2:
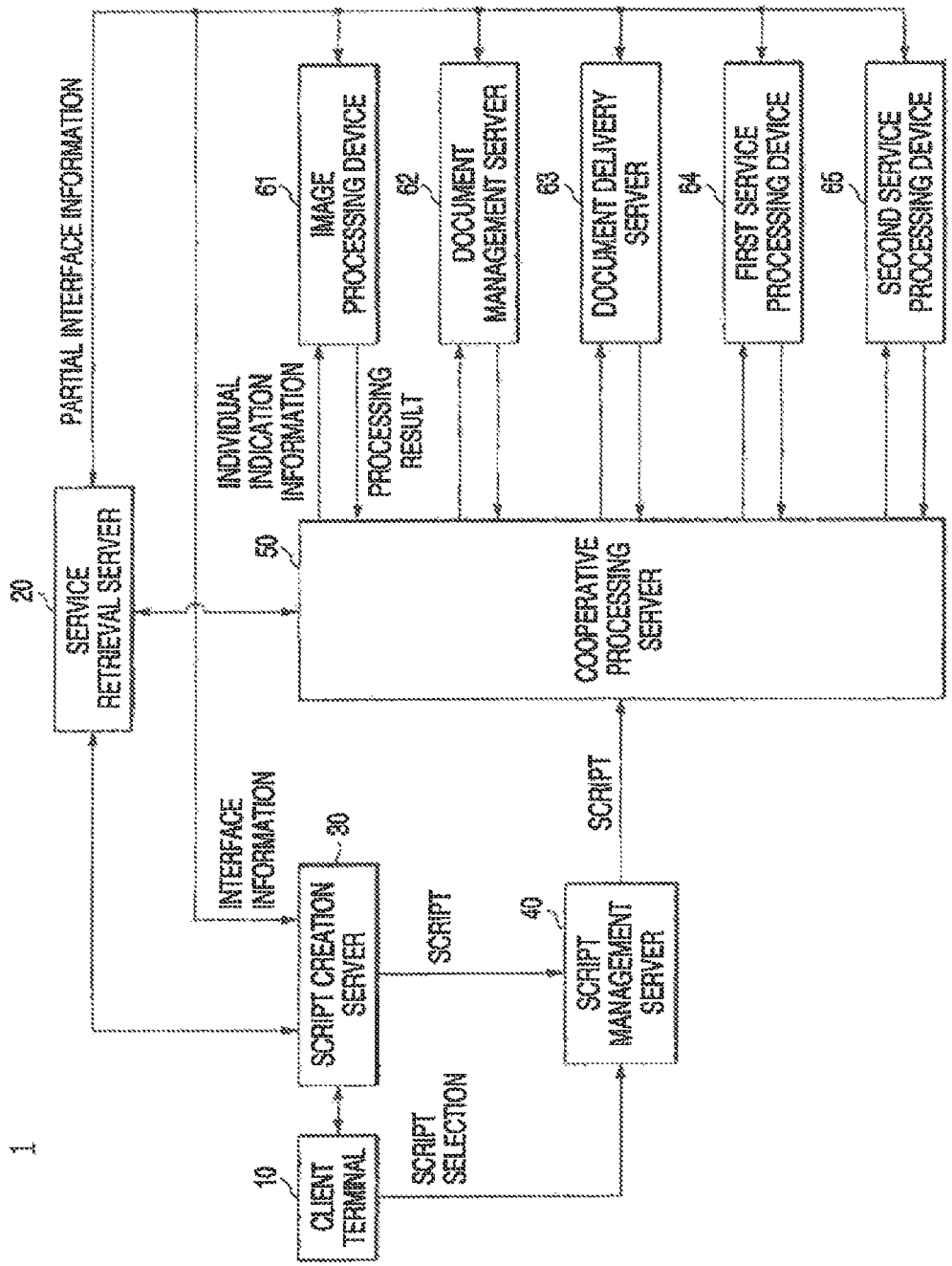
FIG. 2 is a block diagram for explaining the mutual relation of service processing devices configuring the document processing system according to the first embodiment of the invention.

FIG. 2 is a block diagram for explaining the mutual relation of the respective service processing devices configuring the document processing system 1. Each of the service processing devices stores I/F information expressing the contents of the service provided by itself.

FIG. 3 is a view showing the structure of the I/F information. The I/F information is constituted by <Service Class>, <Service Name>, <Service Icon>, <Service Location Information>, <Input>, <Output>, <Parameter Restriction Rules>, <Service Location>, <Method Name>, <Invocation Scheme>, <Implicit Elements> and <Notice Information>.

The <Service Class> is a class of the service provided by the service processing device. Incidentally, what is previously defined is used as the <Service Class> and is equivalent to, for example, scan, print, repository, flow and the like. The <Service Name> is a name of the service provided by the service processing device. The <Service Icon> is position information of an icon displayed on the GUI of the client terminal 10.

The <Service Location Information> is a URL which the script creation server 30 uses for acquiring the I/F information. The <Input> is an input to the service. The <Output> is an output from the service. The <Parameter Restriction Rules> are restriction rules applied to the <Input> and the <Output>. The <Service Location> is position information when the service is actually used. The <Method Name> is a provision method of a service processing.

The <Invocation Scheme> is a scheme for invoking and starting the service processing. Incidentally, as the <Invocation Scheme>, for example, SOAP (Simple Object Access Protocol) as the protocol of message exchange, SMTP (Simple Mail Transfer Protocol), or the like can be used. The <Implicit Elements> are not data which are explicitly delivered as the output to a later stage processing, however, they are data which can be consulted at the later stage processing.

The <Notice Information> is information concerning the progress state of a processing in each service, and for example, a notice form as described below is recited.

(1) In the respective servers (the service retrieval server 20, the script creation server 30, the script management server 40, etc.), in the case where an access occurs, contact with an administrator of the server is made.

(2) In the respective services (copy, print, scan, facsimile transmission/reception, etc.), in the case where a paper jam at the time of manuscript feed, a copy paper jam, or the like occurs at the time of point when the processing is completed, the processing is suspended.

The client terminal 10 has the function of a graphical user interface (GUI) for performing a screen display and for performing a specific operation in order to instruct the creation of a script or to select a script to be invoked.

The service retrieval server 20 retrieves a service corresponding to a retrieval condition from plural services connected to the network 5. The service retrieval server 20 previously stores part of the I/F information (hereinafter referred to as "partial I/F information") (see FIG. 3) of various service processing devices, such as the image processing device 61, the document management server 62, the document delivery server 63, the first service processing device 64, and the service processing device 65. Here, the partial I/F information is the information of <Service Class>, <Service Name>, <Service Location Information>, <Input>, and <Output > in the elements of the I/F information.

When the retrieval condition is transmitted from the script creation server 30 or the cooperative processing server 50, the service retrieval server 20 uses the partial I/F information of the respective service processing devices to retrieve the service. For example, when a service similar to a specific service is retrieved, the service retrieval server 20 may retrieve services which are coincident to each other in the <Service Class>, or may retrieve services which are coincident to each other in the <Input> and <Output>, or may retrieve services which are coincident to each other in all of these.

At the time of creation of the script, the script creation server 30 acquires the I/F information from the respective service processing devices, and creates the script for linking the services provided by the respective service processing devices with each other. The script creation server 30 specifically executes the following processing to create the script.

The script creation server 30 requests specific service processing devices dispersed on the network 5 to transmit the I/F information relating to the respective services on the basis of the <Service Location information>. Incidentally, in the case where the specific service processing device does not exist, the script creation server 30 instructs the service retrieval server 20 to retrieve another service processing device performing the same service as the specific service processing device. Then, the script creation server 30 has only to acquire the <Service Location Information> of the another service processing device from the service retrieval server 20.

Figure 4:
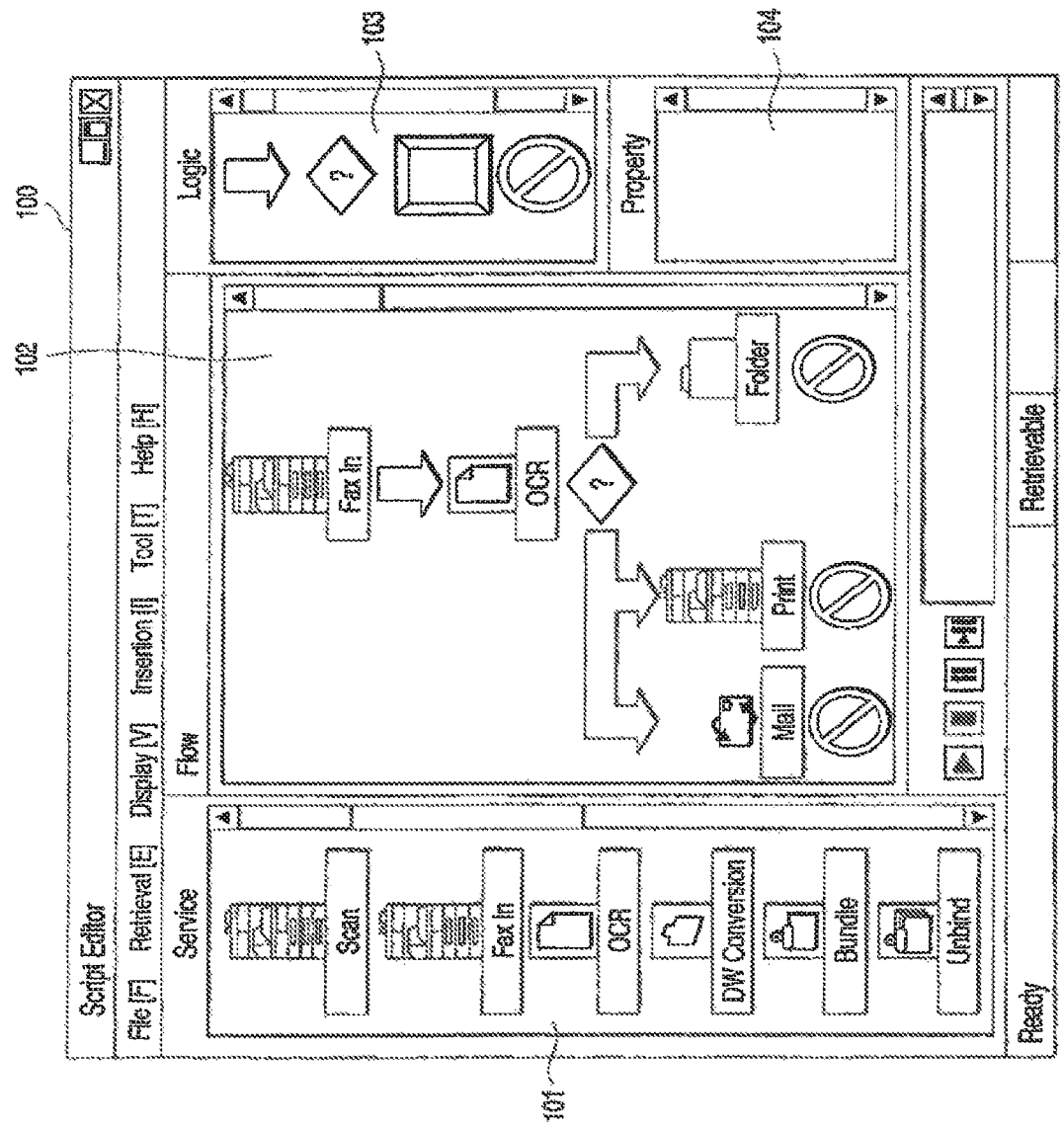
FIG. 4 is a front view of a script creation screen as a GUI screen for defining a job flow according to the first embodiment of the invention.

The script creation server 30 manages the retrieval result from the service retrieval server 20 and the I/F information received from the respective service processing devices. The script creation server 30 creates an HTML file which becomes a GUI screen for defining a job flow on the basis of the I/F information acquired from the respective service processing devices. When receiving a browse request for services from the client terminal 10, the script creation server 30 transmits the HTML file which becomes the GUI screen to the client terminal 10, FIG. 4 is a view showing a script creation screen 100 as the GUT screen for defining the job flow. The script creation screen 100 is constituted by a service window 101, a flow window 102, a logic window 103, and a property window 104.

The service window 101 displays various usable service processing devices. The logic window 103 displays the job flow showing cooperation patterns among the services. The property window 104 displays detailed setting parameters of respective icons displayed on the service window 101 and the logic window 103.

The user can define the job flow on the flow window 102 by dragging and dropping icons of the service window 101 and icons of the logic window 103 to the flow window 102. The user further edits the contents displayed on the property window 104 and can set services and logics in detail.

Figure 6:
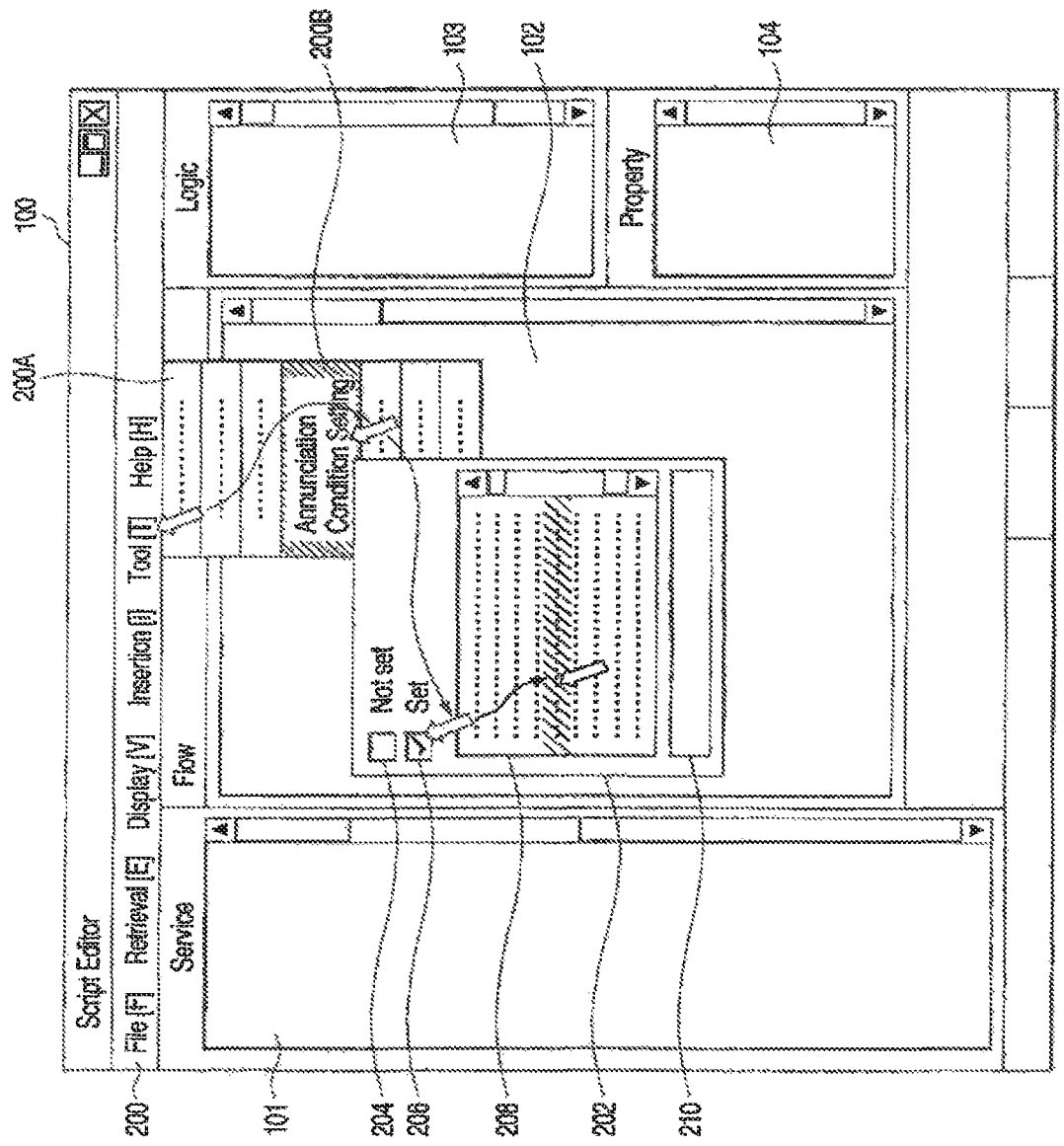
FIG. 6 is a front view of a script creation screen displaying a notice processing condition setting screen according to the first embodiment of the invention.

Here, as shown in FIG. 6, a notice condition menu 200B is set on a tool menu 200A of a pull-down menu 200 of the script creation screen 100.

Figure 7:
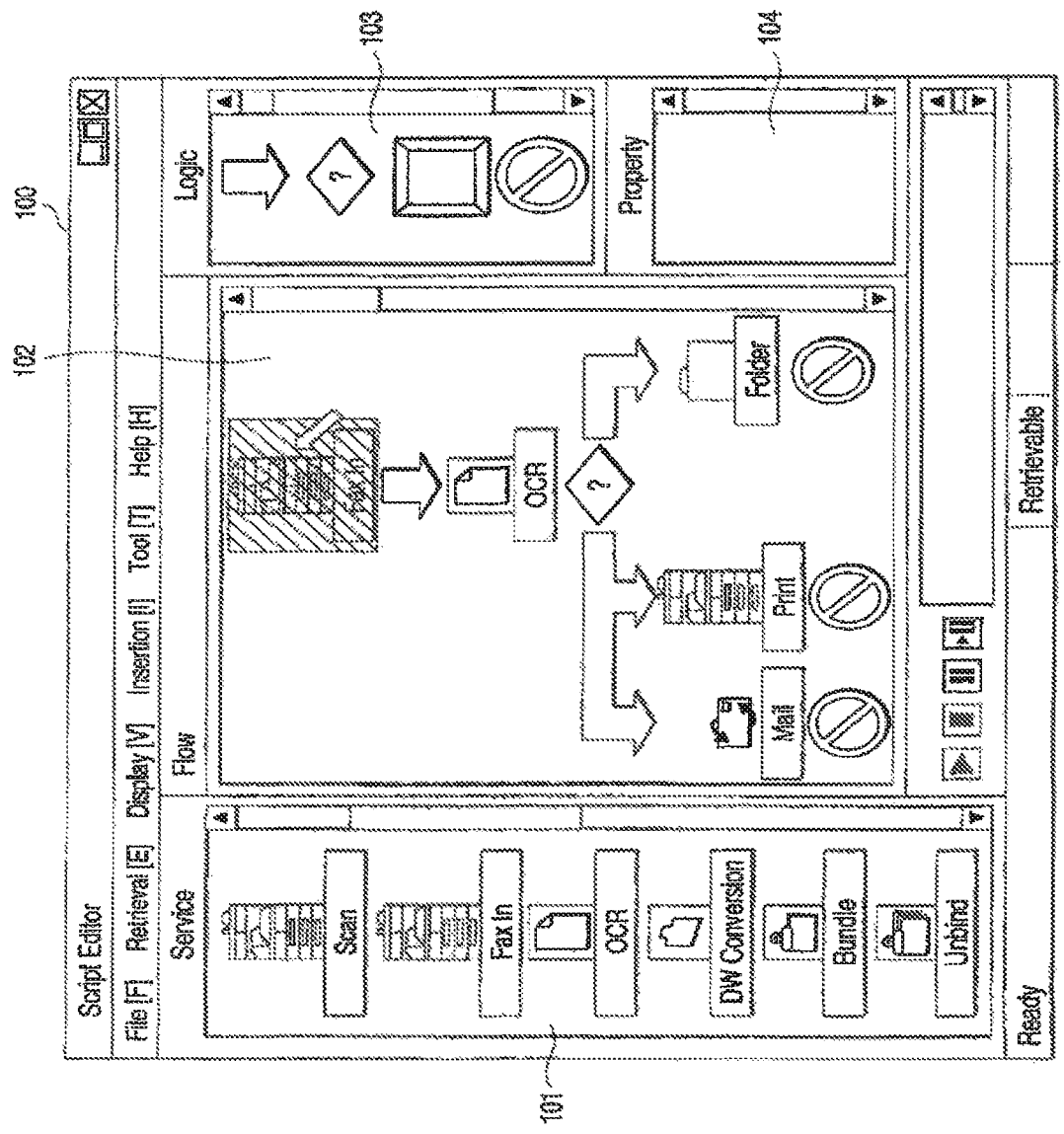
FIG. 7 is a front view of a script creation screen when a service of setting a notice processing condition according to the first embodiment of the invention is selected.

The notice condition menu 200B is a menu which functions when any one of the icons in the service window 101, which was dragged and dropped on the flow window 102, is selected (reverse display) (FIG. 7 shows, as an example, a state in which a FAX icon is selected).

That is, when the notice condition menu 200B is selected in the state where some icon is selected, a notice setting screen 202 as shown in FIG. 6 is displayed.

Two check boxes of "set" and "not set" are provided on the notice setting screen 202, and it is possible to select whether or not a notice condition is especially set for the selected icon (service).

In the case where "not set" is selected (the check box 204 is checked), notice recognized by the information is executed.

In the case where "set" is selected (the check box 206 is checked), a condition item setting screen 208 in the notice setting screen 202 becomes effective, notice information of the selected icon is displayed, and the notice information is successively selected, so that a special notice condition as a script is inputted (set) to a notice condition setting screen 210.

For example, in the case where the selected icon is FAX, as the notice information, "Transmission report is outputted at the time of transmission completion", "Notice is sent when unreadable document data exists", and the like are displayed as a list. As one of them, "Transmission report is outputted at the time of transmission completion" is selected, and as the notice condition added to the indication data, "Mail transmission is made to client terminal at the time of transmission completion (report output is not made)" can be set. Incidentally, with respect to such setting, the notice condition may be set in a job unit (that is, common to plural services), not for each service (FAX, etc.).

Besides, as a matter of course, since the setting is made in an interactive manner with the user in the above, the notice condition is set in the document form, however, similarly to the flow window 102 (GUI), it is internally processed in a program language.

Figure 8:
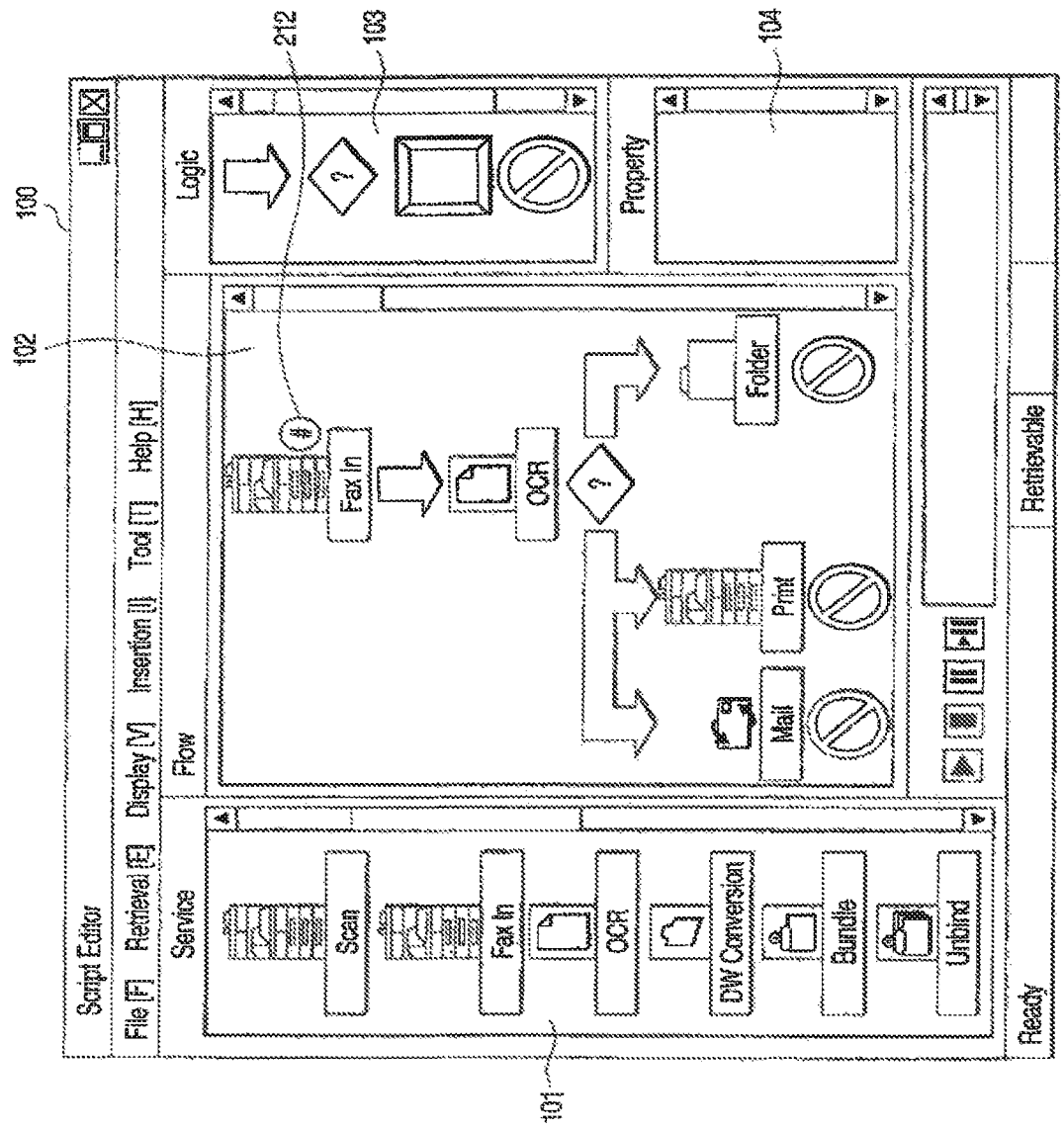
FIG. 8 is a front view of a script creation screen after the notice processing condition according to the first embodiment of the invention is set.

As described above, when the notice condition different from the notice information (I/F information) previously set in the respective services is set, as shown in FIG. 8, a mark ("#" mark with a circle in FIG. 8) 212 indicating that a special notice condition is set is attached to the pertinent icon in the flow window 102, so that it can be judged whether or not the special notice condition is set.

The client terminal 10 transmits the job flow information defined by the operation of the user to the script creation server 30 in accordance with a CGI (Common Gateway Interface) format.

The script creation server 30 creates the script defining the contents of the processing requested to the respective services, input parameters, the way (job flow) of cooperation of the respective services, and information for specifying a document as a processing object, such as a document name and storage location information, on the basis of the job flow information relating to the indication of the service cooperation from the user and the I/F information of the respective services. The script is constituted by files of an XML format.

FIG. 5 is a view showing the script composed in the XML format. Since the cooperative processing itself of the plural services is also regarded as one service, the script has the structure in which <Flow> is added to the I/F information shown in FIG. 3.

The <Flow> is an element for describing the cooperation between services and includes <Invoke>, control structure and logic operation, elements such as < if> for sending a notice, and information for specifying a document as a processing object.

The <Invoke> expresses a specific method of a service processing device, and executes invocation of a service. The element of the <Invoke> includes <Map> expressing the position information of a parameter, and <Method> of an invocation method name. The < it>, < and>, <eq> and <gt> expressing the control structure, the logic operation and the like carry out condition branching at the time of the cooperative processing and the adjustment of parameters delivered between the services.

The script describes all information relating to the control of the cooperative processing of the services in the element of the <flow>. By this, the cooperative processing itself expressed by the script is also regarded as one service. Incidentally, the script is not limited to the structure shown in FIG. 5, and it is sufficient if the respective services can be linked with each other.

The script creation server 30 transmits the script of the XML format as stated above to the script management server 40. Besides, in the case where the execution of the service cooperative processing is instructed by the user, the script creation server 30 may directly transmit the script to the cooperative processing server 50.

The script management server 40 holds the script transmitted from the script creation server 30, and transmits the script to the cooperative processing server 50 in accordance with the request from the client terminal 10.

The cooperative processing server 50 is a server for interpreting and executing the specified script. When the script is transmitted, the cooperative processing server 50 interprets the script, sequentially invokes the respective service processing devices, such as the image processing device 61, the document management server 62, and the document delivery server 63 in accordance with the order and the use method described in the script, and executes the cooperative processing. Besides, the cooperative processing server 50 stores the state of the cooperative processing under execution and the information of the result of the completed cooperative processing, and notifies the state of the cooperative processing and the result in accordance with a request from the outside.

The cooperative processing server 50 interprets the script, and when making a request to the respective service processing devices, the cooperative processing server creates individual indication information having the contents of the processing request, input parameters and information for specifying the document as the processing object. Incidentally, the cooperative processing server 50 may describe the relation to a processing before or after a processing performed by the respective service processing devices, or the processing request may be made in an information exchange form intrinsic to each service processing device, not the form of the script.

The image processing device 61 is a computer which a software program for performing an image processing function is installed. The image processing device 61 performs the processing of the document on the basis of the contents of the service processing request contained in the processing request from the cooperative processing server 50, the input parameters, and the information of the processing object document. Besides, the image processing device 61 notifies the service retrieval server 20 of the partial I/F information at the time of invocation. Further, in accordance with the request from the script creation server 30, the image processing device 61 transmits the I/F information expressing the use method of the image processing service. The I/F information is used when the script is created.

The document management server 62 has a document storage function. The document management server 62 carries out the storage, retrieval, and readout of the document, the change of attribute relating to the document, and various processings on the basis of the information contained in the request from the cooperative processing server 50. Besides, the document management server 62 notifies the service retrieval server 20 of the partial I/F information at the time of invocation. Further, the document management server 62 transmits the I/F information expressing the use method of the document management service in accordance with the request from the script creation server 30.

The document delivery server 63 has functions to store the acquired document into the indicated document management server, to perform mail transmission or FAX transmission to an indicated transmission destination, and to perform a print output processing to an indicated printer. In accordance with the request from the cooperative processing server 50, the document delivery server 63 performs the delivery processing of the document on the basis of the document indicated by the client terminal 10 and the information of the delivery destination. Besides, the document delivery server 63 notifies the service retrieval server 20 of the partial I/F information at the time of invocation. Further, the document delivery server 63 transmits the I/F information expressing the use method of the document delivery service in accordance with the request from the script creation server 30.

The first service processing device 64 is a device for performing a specific service processing relating to the document in accordance with the instruction from the outside. Here, the first service processing device 64 carries out the service processing to be executed by itself on the basis of information such as the contents of the processing request from the cooperative processing server 50, the input parameters, and the information for specifying the document as the processing object. Besides, the first service processing device 64 notifies the service retrieval server 20 of the partial I/F information at the time of invocation. Further, the first service processing device 64 transmits the I/F information expressing the use method of the service processing in accordance with the request from the script creation server 30. Incidentally, the second service processing device 65 operates similarly to the first service processing device 64 except for the contents of the service processing.

In the document processing system 1 configured as described above, when application programs for executing specific services are installed in the respective service processing devices such as the image processing device 61, the document management server 62, and the document delivery server 63, they operate as follows.

The service processing devices, such as the image processing device 61, the document management server 62, and the document delivery server 63, notify the service retrieval server 20 of the partial I/F information containing the information expressing the respective service summaries and addresses at the invocation processing.

The service retrieval server 20 stores the partial I/F information transmitted from the respective service processing devices such as the image processing device 61, the document management server 62 and the document delivery server 63. By this, when a specific service retrieval request is issued from, for example, the script creation server 30 or the cooperative processing server 50, the service retrieval server 20 can perform retrieval by using the partial I/F information.

(Creation of Script)

Figure 9:
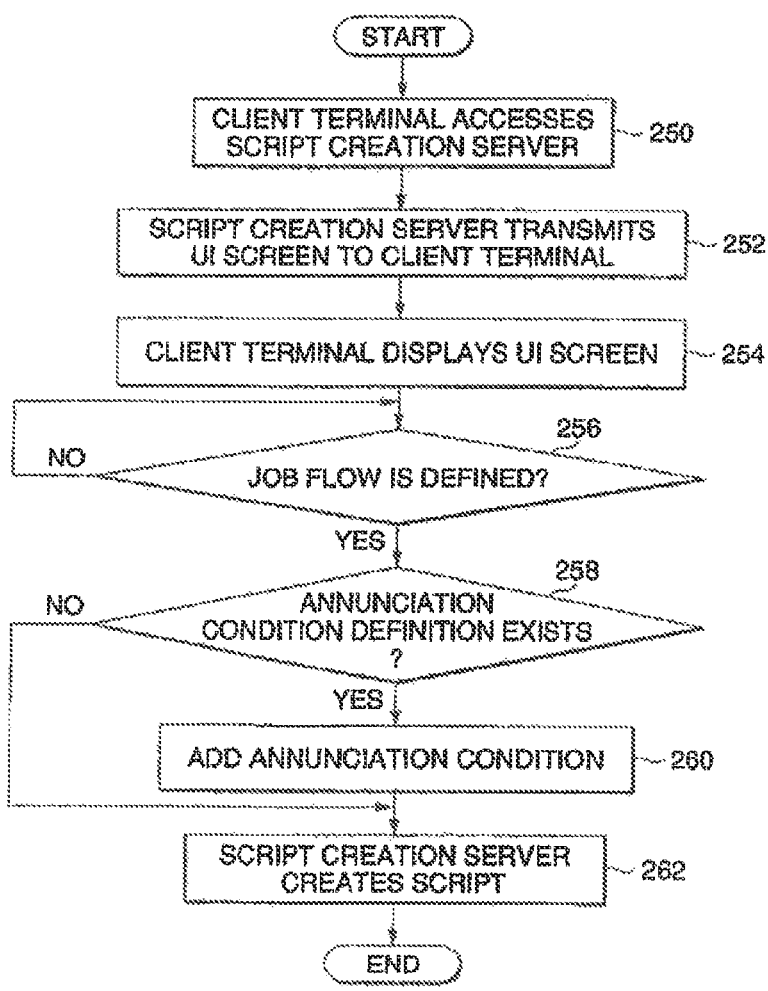
FIG. 9 is a flowchart showing a processing procedure of a client terminal and a script creation server at the time of script creation according to the first embodiment of the invention.

FIG. 9 is a flowchart showing a processing procedure of the client terminal 10 and the script creation server 30 at the time of creating the script.

The client terminal 10 accesses a URL (Uniform Resource Locator) of an HTML file created for the user interface screen provided by the script creation server 30 through an installed browser in accordance with the operation of the user (step 250).

The script creation server 30 transmits the HTML file of the user interface screen to the client terminal 10 in accordance with the browse request from the client terminal 10 (step 252).

The client terminal 10 displays the user interface screen on the basis of the HTML file transmitted from the script creation server 30 (step 254). At this time, the user can define a desired service cooperation job flow by rising the user interface screen displayed on the client terminal 10.

The client terminal 10 judges whether or not the job flow is defined through the user interface screen, and stands by until the job flow is defined (step 256).

When it is judged that the job flow is defined, at next step 258, it is judged whether or not a notice condition definition exists.

That is, in the case where the notice condition defined in the job flow, which is different from notice conditions previously set for the individual services, is specified, the procedure proceeds to step 260, and it is added as an additional element of the definition of the job flow so that this specified notice condition becomes effective in the pertinent service.

Incidentally, the setting of the notice condition is performed in the following procedure.

First, a service is selected from the job flow defined on the completed flow window 102 in order to set the notice condition. For example, in the case where FAX is selected, a pointer is placed on the FAX icon and selection is made by a specific operation (for example, one click of a mouse). The selected FAX icon is highlighted (see FIG. 7).

In the above selection state, the notice processing condition menu 200B is selected from the tool menu 200A of the pull-down menu 200.

When the notice processing condition menu 200B is selected, the notice setting screen 202 shown in FIG. 6 is displayed.

On the notice setting screen 202, when "set" is selected (the check box 206 is checked), the condition item setting screen 208 in the notice setting screen. 202 becomes effective, the notice condition of the selected icon is displayed, and notice conditions are successively selected, so that a special notice condition as a script is inputted (set) to the notice condition setting screen 210.

When the above setting is completed and the notice setting screen 202 is closed, as shown in FIG. 8, the "#" mark 212 indicating that the special notice condition is set is attached to the icon in the flow window 102, so that it is possible to visually judge whether or not the special notice condition is set.

When judging that the job flow is created, the client terminal 10 transmits the job flow information relating to the service cooperation defined by the user to the script creation server 30.

The script creation server 30 creates the script defining the contents of the processing to be requested to the respective services, input parameters, the way of cooperation of the respective services, and information for specifying a document as a processing object, such as a document name and storage location information, on the basis of the information relating to the job flow transmitted from the client terminal 10 and the I/F information acquired from the respective service processing devices (step 262). The script creation server 30 transmits the script of the XML format to the script management server 40.

The script management server 40 stores the script created by the script creation server 30. The script management server 40 stores plural scripts created by the script creation server 30, and reads out a selected script when a selection instruction of a script is issued from the client terminal 10.

(Invocation and Execution of Cooperative Processing)

Figure 10:
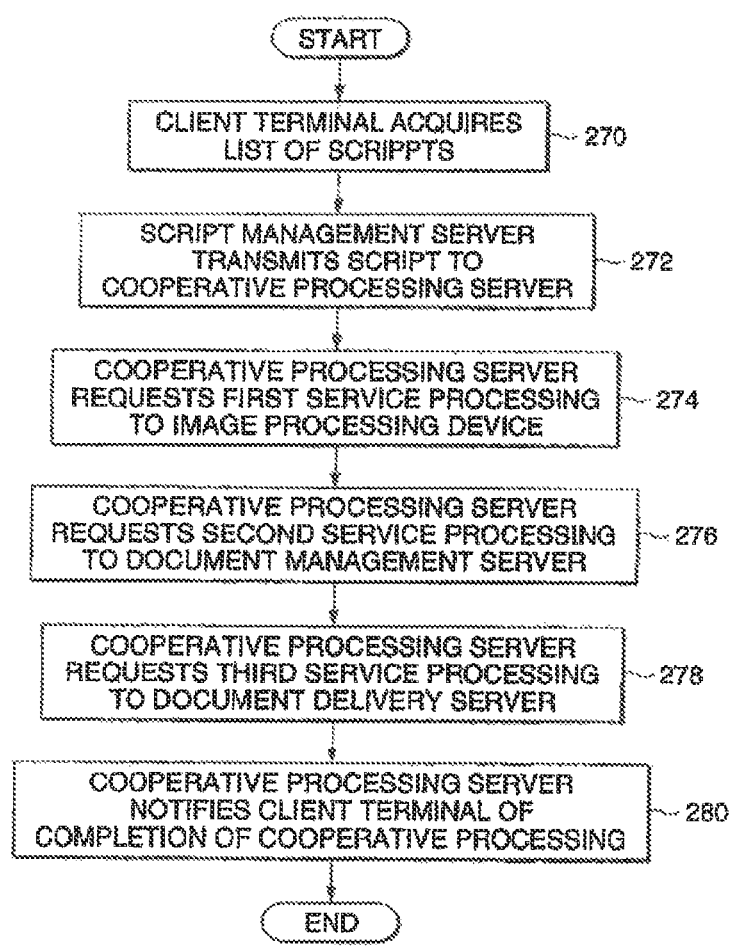
FIG. 10 is a flowchart showing a processing of the client terminal, a script management server and a cooperative processing server according to the first embodiment of the invention.

The user selects a desired script among the plural scripts stored in the script management server 40, and can invoke the cooperative processing. Specifically, this is as follows:

FIG. 10 is a flowchart showing the processing of the client terminal 10, the script management server 40 and the cooperative processing server 50.

The client terminal 10 accesses the script management server 40 and acquires the script list managed by the script management server 40 (step 270).

Figure 11:
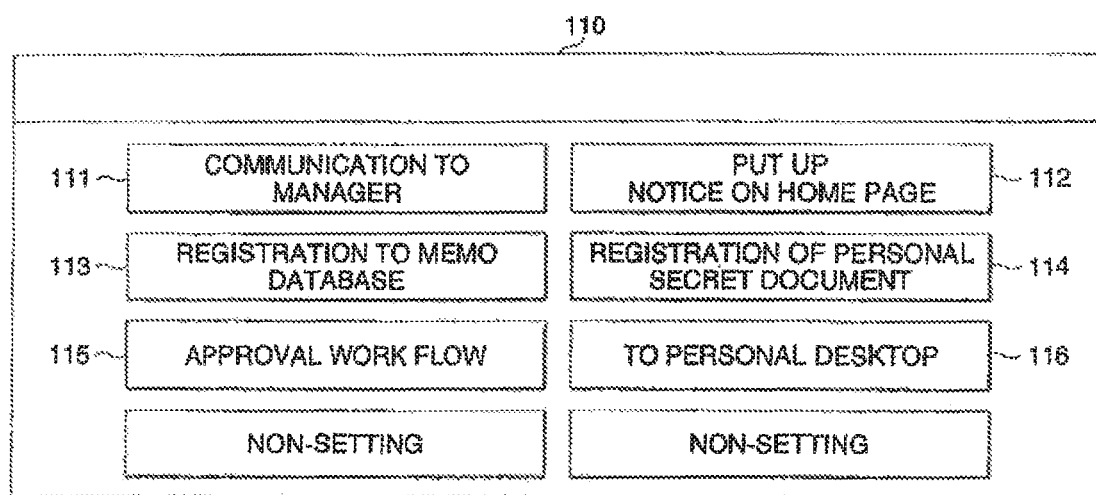
FIG. 11 is an explanatory view showing an example of a service cooperative processing selection screen 110 displaying a script list according to the first embodiment of the invention.

FIG. 11 is a view showing an example of a service cooperation processing selection screen 110 expressing the script list. The service cooperation processing selection screen 110 has buttons 111 to 116 for selecting scripts for the respective scripts. The user can select the script by clicking a desired button from the service cooperation processing selection screen 110.

The client terminal 10 selects the script expressing the specific service cooperation processing from the service cooperation processing selection screen 110 on the basis of the operation instruction of the user, and instructs the invocation of the script.

The script management server 40 transmits the script indicated by the client terminal 10 to the cooperative processing server 50 (step 272). As a result, the cooperative processing server 50 starts the execution of the cooperative processing.

The cooperative processing server 50 interprets the script transmitted from the script management server 40, and requests the image processing device 61 as the first processing described in the script to execute the first service processing (step 274). Specifically, the cooperative processing server 50 extracts the location of the service processing device to which the processing request is made, the input parameter and output parameter form necessary for the processing request, the method name for the processing request, the invocation scheme, and the information for specifying the processing object document on the basis of the information described in the script, and creates individual indication information. The cooperative processing server 50 transmits the individual indication information to the image processing device 61 as the first processing request destination.

The image processing device 61 copies the processing object document and acquires the document on the basis of the location information of the storage destination of the processing object document described in the transmitted script. The image processing device 61 interprets the contents of the service processing request with respect to the acquired document image, performs the image processing such as noise removal or OCR processing, and performs a processing to bind it to the extracted text document. The image processing device 61 again stores into the original storage destination the document in which the image document obtained by the image processing and the text document are bound. When the processing as stated above is completed, the image processing device 61 transmits the processing result, such as the status information (completion) of the processing, the output parameters, and the document storage destination information after the processing, to the cooperative processing server 50.

When receiving the processing result from the image processing device 61, the cooperative processing server 50 manages the result of the first processing request as a log. Then, the cooperative processing server 50 specifies a second processing request destination on the basis of the script, and requests the document management server 62 to perform a second service processing (step 276). Similarly to the first service processing request, the cooperative processing server 50 transmits individual indication information (information of storing a document as information relating to the processing request, information of a storage destination of the document, and information to specify the processing object document) to the document management server 62.

On the basis of the contents of the request of the cooperative processing server 50, the document management server 62 performs, on the basis of the storage destination information described in the request content, a storage processing of the document processed and stored in the former processing (first service processing). When the processing as stated above is completed, the document management server 62 transmits the processing result, such as the status information (completion) of the processing, the output parameter, and document storage destination information after the processing, to the cooperative processing server 50.

When receiving the processing result of the second service processing (document storage processing), the cooperative processing server 50 manages the result of the second processing request as a log. The cooperative processing server 50 specifies a third processing request destination on the basis of the script, and requests the document delivery server 63 to carry out a third service processing (step 278). Similarly to the second service processing request, the cooperative processing server 50 transmits individual indication information (information of storing a document as information relating to the processing request, information of a storage destination of the document, and information to specify the processing object document) to the document delivery server 63.

On the basis of the contents of the request of the cooperative processing server 50, with respect to the document processed and stored in the former processing (second service processing), the document delivery server 63 reads out the document file on the basis of the information (storage destination information) to specify the document, and performs the processing described in the contents of the request. Here, the document delivery server 63 mails only a text document to a mail address specified as a delivery destination in the document in which the text document and the image document are bound, and faxes only the image document to a FAX number. When the processing is completed, the document delivery server 63 transmits the processing result, such as the status information (completion) of the processing, the output parameter, and document storage destination information after the processing, to the cooperative processing server 50.

In this processing, for example, in the FAX transmission processing, in the case where the opposite party was engaged on the phone, and even if a retry was performed a predetermined number of times, the connection with the opposite party could not be established, the document delivery server 63 transmits the status information "mail transmission; completed, FAX transmission: non-transmission" to the cooperative processing server 50.

The cooperative processing server 50 receives the processing result from the third service processing, and when judging that a next processing is not described in the script, the cooperative processing server 50 notifies the client terminal 10 that all processings are completed, and ends the cooperative processing (step 280).

Incidentally, in this embodiment, although the service retrieval server 20 acquires part (partial I/F information) of the I/F information from the respective service processing devices, all of the I/F information may be acquired.

Here, in this embodiment, although there is no problem in the case where the cooperative processing as stated above is properly carried out, in the case where a notice event occurs in some service, a measure to the notice event is simultaneously managed.

That is, the cooperative processing server 50 recognizes notice information in the respective services as a piece of information in the partial information shown in FIG. 5.

On the other hand, there is a case where a definition of a notice condition different from notice conditions previously set for the respective services is added to the script data.

Then, when the notice event occurs in some service, it is judged whether or not the definition of the notice condition of the service exists in the script data, and a proper notice processing is carried out.

Figure 12:
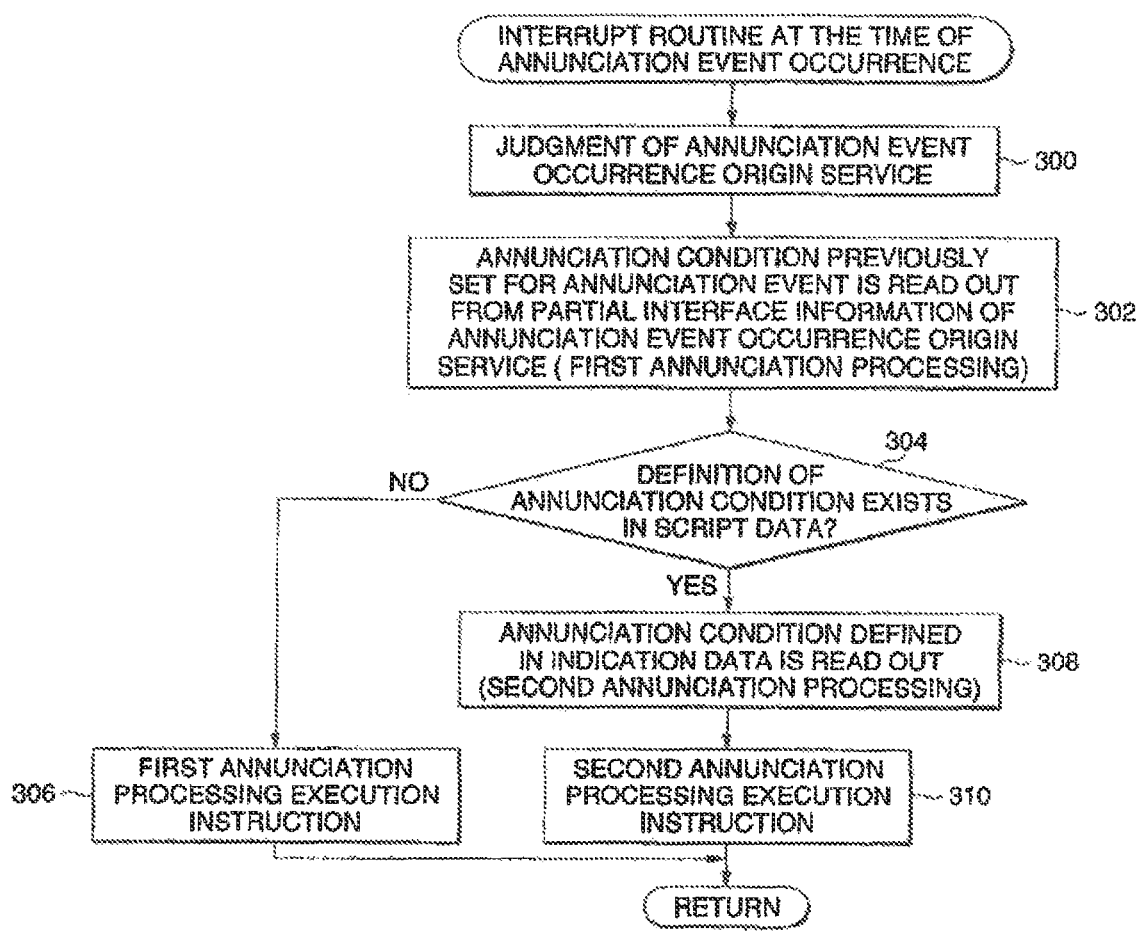
FIG. 12 is a flowchart showing a notice processing selection control routine interrupting at the time of notice event occurrence according to the first embodiment of the invention.

Hereinafter, a notice processing selection control interrupting at the time of a notice event occurrence will be described with reference to a flowchart of FIG. 12.

At step 300, a notice event occurrence origin service is judged, and when the judgment is completed, the procedure proceeds to step 302, and the notice condition previously set for the notice event is read out from the partial information of the notice event occurrence origin service and is made a first notice processing.

At next step 304, it is judged whether or not the definition of the notice condition corresponding to the notice event exists in the script data, and in the case of negative judgment, that is, in the case where it does not exist in the script data, the procedure proceeds to step 306, and an instruction to carry out the first notice processing is issued.

On the other hand, at the step 304, in the case of affirmative judgment, that is, in the case where the definition of the notice condition exists in the script data, the procedure proceeds to step 308, this defined notice processing is read out and is made a second notice processing, and it proceeds to step 310.

At the step 310, an instruction to carry out the second notice processing is issued, and this routine is ended.

Incidentally, in the above first embodiment, although the notice at the time of processing completion of the respective services has been mainly described as the notice event, other various conditions can be set as the notice condition. Examples of the notice condition will be described below.
(1) Notice Condition Common in Job Units
When the processing of each service is completed, a notice is made to the client terminal.
(2) Execution of a Processing Different from Indication Data
When a processing is being performed in accordance with the indication data, and when the pertinent service operates, a notice is made to the client terminal.
(3) Processing Different from Indication Data by a Specific User
Since a processing carried out by a system administrator (Key Operator), a CE (Customer Engineer) or the like includes information which is desired not to be known to a general user (Casual User), any notice is not made.
(4) Login to a Specific Server, and Access to a Secret Document File
In the case where login to a specific server occurs, or there occurs an access to a secret document file stored in a server or a HDD of each service, a notice is made to the CE.
(5) Access to a Pay Server or Execution of Service
In the case where there is a charge for use, a notice is made to a client terminal before the use.

Besides, as a specific method of notice, any method may be used as long as a user can dearly recognize, for example, a message transmission, a mail transmission, a FAX transmission, a log record, a report output (print), a display to a user interface or the like is used, or two or more of them may be combined and executed.

As described above, in the first embodiment, when a notice event occurs, in the case where a notice condition concerning the notice event is defined in the indication data, a notice is made on the basis of the notice condition defined in the indication data, to which a higher priority is given than to the previously set notice condition, and therefore, in the case where accounting is necessary over all jobs, or in the case where importance is attached to security or privacy, a notice most suitable for the job can be selected.

Second Embodiment

Next, a second embodiment of the invention will be described. Incidentally, the same parts as those of the first embodiment are denoted by the same reference numerals and the detailed description will be omitted.

Figure 13:
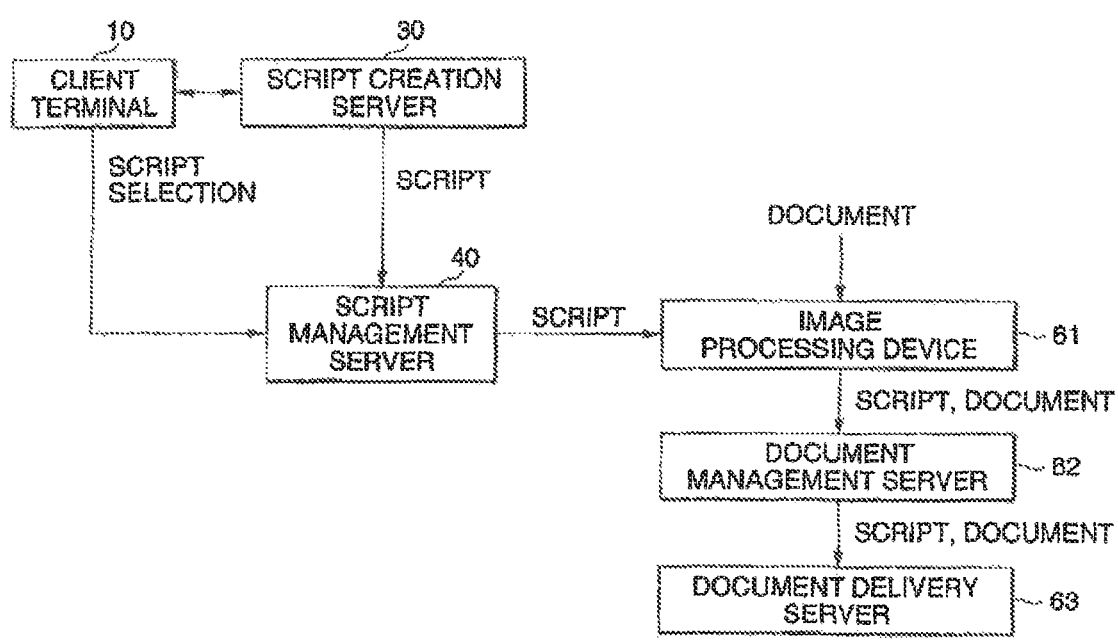
FIG. 13 is a block diagram showing the mutual relation of service processing devices configuring a document processing system according to a second embodiment.

FIG. 13 is a block diagram for explaining the mutual relation among respective service processing devices configuring a document processing system 10A according to the second embodiment. The document processing system 10A according to the second embodiment can carry out the cooperative processing of plural services without using the cooperative processing server 50 shown in FIGS. 1 and 2.

Incidentally, although the document processing system 10A includes the service processing devices (except for the cooperative processing server 50) shown in FIG. 1, FIG. 13 shows only the service processing devices relating to the cooperative processing.
(Invocation and Execution of Cooperative Processing)
A user selects a desired script among plural scripts stored in a script management server 40 and can invoke the cooperative processing. Specifically, this is as follows.

A client terminal 10 selects a script expressing a desired service cooperation processing from a service cooperation processing selection screen in accordance with the operation of the user, and instructs the invocation of the script. The script management server 40 transmits the script indicated by the client terminal 10 to an image processing device 61.

The image processing device 61 acquires a document as a processing object on the basis of storage destination location information of the processing object document described in the transmitted script. The image processing device 61 interprets the contents of a service processing request with respect to the acquired document image, performs the image processing such as noise removal and OCR processing, and performs a processing to bind it to the extracted text document. After the specific image processing is ended, the image processing device 61 deletes the service processing request described in the script. Then, the image processing device 61 transmits the document in which the image document obtained by the image processing and the text document are bound, and the script including the processing result such as the status information (completion) of the processing, the output parameter, and document storage destination information after the processing, to a document management server 62 for providing a next service processing.

The document management server 62 temporarily stores the document transmitted from the image processing device 61 into a storage destination described in the script. Then, the document management server 62 deletes the service processing request described in the script, and transmits the document and the script to a document delivery server 63 for performing a next service processing.

On the basis of the script, the document delivery server 63 mails only the text document to a mail address specified as a delivery destination in the document in which the text document and the image document are bound, and faxes only the image document to a specified FAX number. Then, when judging that a next processing is not described in the script, the document delivery server 63 notifies the client terminal 10 that all processings are completed, and ends the cooperative processing.

Also in the second embodiment, the addition of a notice to the script data as described in the first embodiment is performed, so that a notice processing most suitable for the job can be carried out in the respective services.

Incidentally, in the first and the second embodiments, in the case where the notice condition is defined in the indication data, the notice is always carried out on the basis of the notice condition defined in this indication data, however, in the case where some condition is satisfied, a higher priority is given to a notice mode set for the respective services than to the notice data recited in the script, and the notice mode may be applied.

As described above, according to the invention, in the case where a service for performing specified multiple processings of document data as one job is processed in a cooperative manner on a network, a service processing state is exhibited in a proper notice form in each job unit and each processing unit in the job, and therefore, it is possible to obtain an excellent effect that the processing state can be properly recognized from the viewpoint of accounting, security, and privacy.

What is claimed is:

1. A document processing system comprising:
a memory that stores a script that describes a plurality of processes performed by a plurality of service processing devices, the plurality of processes including a sending process to send document data to a plurality of different devices, the script including a notice condition for providing a notice and a specific method of providing the notice; and
a processor configured to:
send the document data to each of the plurality of different devices according to the script;
provide the notice by the specific method when a notice event which fulfills the notice condition occurs in a case where the notice condition concerning the notice event is defined in the script,
wherein the notice condition and the specific method are set for at least one of the plurality of processes in the script by a user; and
wherein when the notice event occurs in a case where the notice condition concerning the notice event is not defined in the script, the processer is further configured to provide a notice based on another notice condition that is not defined in the script.

2. The document processing system according to claim 1, wherein
the script describes the plurality of processes performed by the plurality of service processing devices as one job, and
the processor is further configured to provide the notice during a progress of the one job.

3. A document processing method comprising:
storing a script in a memory, the script describing describes a plurality of processes performed by a plurality of service processing devices, the plurality of processes including a sending process to send document data to a plurality of different devices, the script including a notice condition for providing a notice and a specific method of providing the notice;
sending the document data to each of the plurality of different devices according to the script;
providing the notice by the specific method when a notice event which fulfills the notice condition occurs in a case where the notice condition concerning the notice event is defined in the script,
wherein the notice condition and the specific method are set for at least one of the plurality of processes in the script by a user; and
when the notice event occurs in a case where the notice condition concerning the notice event is not defined in the script, providing a notice based on another notice condition that is not defined in the script.

4. A non-transitory computer readable medium storing a program causing a computer to executed a process, the process comprising:
storing a script in a memory, the script describing describes a plurality of processes performed by a plurality of service processing devices, the plurality of processes including a sending process to send document data to a plurality of different devices, the script including a notice condition for providing a notice and a specific method of providing the notice;
sending the document data to each of the plurality of different devices according to the script;
providing the notice by the specific method when a notice event which fulfills the notice condition occurs in a case where the notice condition concerning the notice event is defined in the script,
wherein the notice condition and the specific method are set for at least one of the plurality of processes in the script by a user; and when the notice event occurs in a case where the notice condition concerning the notice event is not defined in the script, providing a notice based on another notice condition that is not defined in the script.

\* \* \* \* \*